(12) United States Patent
Dennis et al.

(10) Patent No.: US 10,168,438 B2
(45) Date of Patent: Jan. 1, 2019

(54) ANALYSIS OF SIGNALS FROM PIXELLATED DETECTORS OF IONIZING RADIATION

(71) Applicant: Diamond Light Source Limited, Didcot, Oxon, Oxfordshire (GB)

(72) Inventors: Graham John Dennis, Didcot (GB); William Helsby, Widnes (GB)

(73) Assignee: Diamond Light Source Limited, Didcot, Oxon, Oxfordshire (GB)

( * ) Notice: Subject to any disclaimer, the term of this patent is extended or adjusted under 35 U.S.C. 154(b) by 46 days.

(21) Appl. No.: 15/312,124

(22) PCT Filed: May 19, 2015

(86) PCT No.: PCT/GB2015/051470
§ 371 (c)(1),
(2) Date: Nov. 17, 2016

(87) PCT Pub. No.: WO2015/177534
PCT Pub. Date: Nov. 26, 2015

(65) Prior Publication Data
US 2017/0102468 A1    Apr. 13, 2017

(30) Foreign Application Priority Data

May 19, 2014 (GB) .................................. 1408853.8

(51) Int. Cl.
*G01T 1/36*    (2006.01)
*G01T 1/29*    (2006.01)

(52) U.S. Cl.
CPC ............ *G01T 1/366* (2013.01); *G01T 1/2928* (2013.01)

(58) Field of Classification Search
CPC ...... G01T 1/247; G01T 1/24; G01T 1/246; G01T 1/005; G01T 1/026; G01T 1/366; G01T 1/2928
USPC .............. 250/370.01, 370.09, 363.03, 252.1, 250/363.04, 370.07, 394, 371
See application file for complete search history.

(56) References Cited

U.S. PATENT DOCUMENTS 3,752,986 A * 8/1973 Fletcher .................... G01T 1/36
                                                          250/394
4,370,741 A * 1/1983 Haass ...................... H04B 3/23
                                                          370/201

(Continued)

OTHER PUBLICATIONS

Boucher, et al., "Theoretical Energy Calibration of Multiple-Pixel Events in a Wide Band-Gap Semiconductor Detector with Pixellated Electrodes," *IEEE Nuclear Science Symposium Conference Record*, 2009, pp. 1628-1630.

(Continued)

*Primary Examiner* — David Porta
*Assistant Examiner* — Blake Riddick
(74) *Attorney, Agent, or Firm* — Leydig, Voit & Mayer, Ltd.

(57) ABSTRACT

The invention relates to signals representing energy of photons or particles of ionizing radiation incident on pixels of a semiconductor detector. Cross talk between the signals from different pixels is compensated using cross talk compensation signatures in the form of time domain series or functions which are aligned and applied to the cross talk signal in accordance with timing of the event which gave rise to the cross talk.

24 Claims, 5 Drawing Sheets

(56) References Cited

U.S. PATENT DOCUMENTS

| | | | | |
|---|---|---|---|---|
| 4,858,151 | A * | 8/1989 | Habara | G01T 1/1647 250/363.07 |
| 5,440,322 | A * | 8/1995 | Prince | G09G 3/20 345/55 |
| 5,506,408 | A * | 4/1996 | Vickers | G01T 1/1642 250/366 |
| 5,982,847 | A * | 11/1999 | Nelson | G01N 33/2858 378/45 |
| 6,097,785 | A * | 8/2000 | Elam | G01N 23/223 250/253 |
| 6,140,649 | A * | 10/2000 | Lonn | G01T 1/1615 250/363.02 |
| 6,249,003 | B1 * | 6/2001 | Culp | G01T 1/1648 250/363.02 |
| 6,288,399 | B1 * | 9/2001 | Andreaco | G01T 1/1642 250/363.03 |
| 7,456,878 | B1 | 11/2008 | Sun et al. | |
| 2002/0011571 | A1 * | 1/2002 | Lin | G01T 1/2018 250/366 |
| 2002/0121604 | A1 * | 9/2002 | Katagiri | G01T 1/1644 250/368 |
| 2006/0289765 | A1 | 12/2006 | Ikhlef et al. | |
| 2007/0235657 | A1 * | 10/2007 | He | G01T 7/005 250/389 |
| 2011/0019823 | A1 * | 1/2011 | Townsend | H04L 9/0852 380/256 |
| 2012/0015825 | A1 * | 1/2012 | Zhong | G01N 21/6428 506/6 |
| 2012/0104262 | A1 * | 5/2012 | Wiegert | G01N 23/046 250/363.03 |
| 2012/0147230 | A1 * | 6/2012 | Vaillant | H04N 5/359 348/273 |
| 2012/0166128 | A1 | 6/2012 | Ikhlef et al. | |
| 2012/0173175 | A1 | 7/2012 | Devicharan et al. | |
| 2012/0207277 | A1 * | 8/2012 | Sako | G01T 1/17 378/91 |
| 2012/0255615 | A1 * | 10/2012 | Sellinger | H01L 51/0053 136/263 |
| 2013/0126748 | A1 * | 5/2013 | Rao | G01T 1/247 250/394 |
| 2013/0168562 | A1 | 7/2013 | Brambilla et al. | |
| 2014/0226789 | A1 * | 8/2014 | Bendahan | G01N 23/203 378/86 |

OTHER PUBLICATIONS

Brambilla et al., "CdTe Linear Pixel X-Ray Detector with Enhanced Spectrometric Performance for High Flux X-Ray Imaging," *IEEE Transactions on Nuclear Science*, 59(4), Aug. 2012, pp. 1552-1553.

European Patent Office, International Search Report in International Patent Application No. PCT/GB2015/051470, dated Jul. 24, 2015, 4 pp.

European Patent Office, Written Opinion in International Patent Application No. PCT/GB2015/051470, dated Jul. 24, 2015, 6 pp.

Farrow et al., "X-Ray Signal Processing Electronics for Solid State Detectors," *Review of Scientific Instruments*, 66(2), Feb. 1995, pp. 2307-2309.

Farrow et al., "XSPRESS: A New Generation of Detector System for EXAFS Studies," *Physica B*, 208, 1995, pp. 256-258.

Kim et al., "Charge Sharing in Common-Grid Pixelated CdZnTe Detectors," *Nuclear Instruments and Methods in Physics Research A*, 654, Jun. 22, 2011, pp. 233-243.

United Kingdom Intellectual Property Office, Search Report in United Kingdom Patent Application No. GB1408853.8, dated Nov. 20, 2014, 4 pp.

United Kingdom Intellectual Property Office, Search Report in United Kingdom Patent Application No. GB1508576.4, dated Nov. 5, 2014, 4 pp.

* cited by examiner

ANALYSIS OF SIGNALS FROM PIXELLATED DETECTORS OF IONIZING RADIATION

CROSS-REFERENCE TO RELATED APPLICATIONS

This application is a national phase application of International Patent Application No. PCT/GB2015/051470, filed May 19, 2015, which claims priority to Great Britain Patent Application No. GB 1408853.8, filed May 19, 2014, both of which are incorporated by reference herein in their entireties for all purposes.

TECHNICAL FIELD

The present invention relates to the processing of signals received from semiconductor detectors for detecting ionizing radiation such as X-rays, and in particular to processing signals received from such semiconductor detectors having a plurality of pixels. The invention also relates to apparatus for carrying out such processing, and to arrangements combining such a detector and such apparatus. By way of example only, the invention may be used in the field of X-ray spectroscopy using synchrotron light sources, and the detector may be a monolithic multi-element hyper pure germanium detector.

INTRODUCTION

Hyper pure germanium (HPGe) detectors which are monolithic and segmented are used at synchrotron light sources for high resolution spectroscopy. In order to exploit the increasing brilliance of such sources, beam lines require detectors that do not saturate nor lose their energy resolving capabilities as X-ray flux increases. There are two main approaches used for detector system performance to keep pace with increasing flux. They are to increase the number of pixels in a given solid angle, and enable a given number of pixels to work to higher per pixel count rate without performance degradation.

The UK based Diamond Light Source, for example, combines both of these approaches on their main spectroscopy beam lines, employing monolithic segmented HPGe detectors with a large number of pixels, instrumented with in-house designed fast low-noise preamplifiers coupled to digital signal processing electronics which analyse the signal from each pixel and enable a spectrum of the incident X-rays to be derived.

It has been observed that two of the important specifications for X-ray fluorescence spectroscopy—energy resolution and peak to background ratio—degrade considerably as the count rate per pixel increases, becoming more pronounced with increasing energy.

The invention seeks to address these and other problems of the related prior art.

SUMMARY OF THE INVENTION

The inventors have observed that close inspection of the electrical signals from different pixels in pixelated semiconductor detectors show that there is considerable cross talk into other pixels from X-ray interactions occurring on neighbouring pixels, leading to degraded performance. The invention therefore provides a signal processing algorithm that corrects for pixel-to-pixel cross talk occurring between pixels in monolithic segmented HPGe detectors and other detectors of ionizing radiation. The inventors have found that pixel-to-pixel cross talk leads to compromised rate resolution performance on fluorescence spectroscopy detectors, for example on high brilliance spectroscopy beam lines, and elsewhere. The inventors therefore acquired X-ray fluorescence signals from a HPGe pixel detector digitised by a digital pulse processor (DPP). These signals were applied to an emulation of the same DPP. Experimental data of low radiation incidence rate was used to identify and then characterise pixel-to-pixel cross talk, enabling energy normalised event cross talk signatures or profiles specific to each adjacent pixel pairing to be generated.

In particular, these cross talk signatures or profiles can be generated as time domain functions (which could be continuous in time, or discrete series in time), to be applied to the signals from adjacent pixels using a superposition such as an addition or subtraction, after being aligned or synchronised to match the timing of the event in the main pixel. The cross talk signatures may also be scaled according to an event height and/or other properties of the signals, especially such properties of the event in the main pixel (and optionally including other such events in the main pixel which are proximal in time to the main event).

In other words, each cross talk signature represents a shape or profile of a cross talk signal expected in the signal of one or more pixels affected by cross talk due to an event in another pixel. This shape or profile can then be scaled or otherwise modified according to properties of the event (and optionally properties of other events, for example other detected events which are proximal in time in the same or other pixels), and applied to the cross talk affected pixel(s) to compensate for the cross talk.

Further detector signals covering a wide range of count rates were then passed through the DPP emulation, initially obtaining a coarse event height estimate and timestamp per event per pixel. The event heights were used to scale the normalised cross talk signatures for the pixel into its neighbours, before using event timestamps to synchronise the subtraction, addition or other combination or superposition of these unique rescaled signals from a delayed version of the raw neighbour pixel data. This effectively eliminated many cross talk artefacts on a single pixel in a single pass. Second pass processing of cross talk corrected data can then be used to reduce phantom event triggers from crosstalk, which can further optimise the signal analysis.

The cross talk compensated data was further processed by additional processing algorithms. When compared to the identical signals processed without cross talk correction, the output of this emulation showed typically 35% improvement in energy resolution and doubled peak to background ratio.

The invention therefore provides an analyser arranged to receive signals from a semiconductor detector of ionizing radiation, the semiconductor detector comprising a plurality of pixels, each pixel being arranged to output a signal comprising a series of event features, each event feature representing response of the pixel to an ionizing particle or photon of radiation incident on the pixel, the signals received by the analyser exhibiting cross talk between each other whereby the event features, or at least some of the event features, give rise to corresponding cross talk features in the signal from at least one other pixel, for example an adjacent pixel.

Typically, the event features will have characteristic shapes or profiles, for example they may be step features in the pixel signals, with the size or height of each step being indicative of the energy of the photon or particle of ionizing radiation giving rise to the step feature. In this way, the pixel signals contain spectral information about the incident particles. Depending on the detector and other effects, such a step feature may typically be of the order of tens to a few hundred nanoseconds in duration, including surrounding characteristics of the feature such as post step movements of the signal as seen in FIG. 4. The cross talk signals in the electrical signals from other pixels is then likely to be of similar time extent, and may take various shapes, profiles or forms such as single peaks, or oscillations of two or more peaks.

The analyser stores or comprises or is provided with one or more cross talk compensation or cancellation signatures (which may also be referred to cross talk compensation profiles), and for each pixel, the analyser is arranged to detect event features in the signal from that pixel, and to compensate or cancel the cross talk in analysis of the concurrent signals from one or more other pixels using selected ones of the one or more cross talk compensation or cancellation signatures or profiles. This could be achieved by an initial correction of the other pixel signals for the cross talk followed by analysis to detect required characteristics of those signals, by application of the signatures as part of the analysis to detect required characteristics, as combinations of these, or in other ways.

The cross talk compensation/cancellation signatures may be provided, for example, as time series of data points, as analytical functions, or in other ways as discussed below. Each signatures has a shape or profile related to the expected shape or profile of cross talk due to an event in another pixel. In other words, the cross talk compensation signatures are typically time based functions or time domain functions, which can therefore be aligned or synchronized with the event feature giving rise to the cross talk, for combination (for example by superposition) with the signal in the adjacent or other pixels to seek cancellation or reduction of the cross talk. This alignment may be carried out by a detection of timing of the event and simple alignment of the signature to that event, or in other or additional ways for example by also seeking a best fit of the compensation signature to the cross talk signal.

Typically, the cross talk compensation signatures or profiles are provided in a form for use which is normalised with respect to one or more properties of the event features, and the analyser is arranged to measure said one or more properties of each said detected event feature and to scale the selected ones of the one or more cross talk compensation signatures according to the measured properties for use in compensating analysis of the concurrent signals. Typically the scaling may be carried out using a magnitude or height of the event feature, which may typically correspond to or be directly related to an energy of the incident photon or particle giving rise to the event feature. However, other properties of an event to be compensated, and/or other events proximal in time to that event may be used in such scaling. For example, a measure of the number and/or proximity of multiple events proximal to the event to be compensated could be used in such a scaling.

The scaling of the compensation signatures may be carried out as part a process of combination (such as superposition) of the signature with the signal to be compensated, or may take place prior to this combination.

The cross talk compensation/cancellation signatures may comprise at least one such signature for each pixel, for use in respect of one, more or all adjacent pixels, or other pixels, and may more particularly comprise a set of signatures for each pixel, the set comprising a different signature for use in compensating/cancelling cross talk in the concurrent electrical signals each different adjacent or other pixel.

The cross talk to be compensated/cancelled may arise from interactions within the semiconductor detector itself, in which case cross talk can be expected to be predominantly seen in pixels adjacent in the semiconductor detector to a pixel in which an event is detected, although some cross talk may also be seen from such effects in non adjacent pixels. The invention may provide cross talk signatures and compensation applied primarily or only in respect of adjacent pixels, and/or in respect of all adjacent pixels, or may be applied to other non-adjacent pixels as well. However the cross talk to be compensated may also or instead arise in the electrical paths between the semiconductor sensor and the analyser, for example between preamplifiers, conductors and/or other parts of these paths. Since the geometrical arrangements of such aspects of the electrical paths may not correspond to the layout of pixels in the detector, the cross talk between these paths may similarly not be dominated or solely seen in respect of pixels which are adjacent in the semiconductor detector. The invention therefore also provides cross talk signatures and compensation more generally applied to pairs of pixels, which may or may not be adjacent.

Each cross talk compensation signature may apply to a particular pair of pixels, and in particular to a directed pair in the sense that the signature is used to compensate the signal of the second member of the pair due to a detected event in the signal of the first member of the pair. For each pixel of the detector, which for these purposes we can refer to as a first pixel, a set of such pairs may be provided, with each pair of the set being used for cross talk compensation of the signal from a different second pixel in respect of a detected event in the of the first pixel, where the set may include only second pixels which are adjacent to the first pixel, may include all of the second pixels adjacent to the first pixel, or some other combination of second pixels.

Typically, the magnitude of the cross talk is closely related, for example being approximately linearly related to the magnitude or height of the detected event feature, which typically represents the energy of the detected particle or photon. The time function cross talk compensation signatures may therefore be provided in a form for use which is normalised with respect to one or more properties of the event features, such as event height or corresponding particle energy. The analyser may then be arranged to scale the cross talk signatures according to one or more properties of the concurrent detected event feature causing the cross talk, and to apply the scaled signatures to the signals of other pixels, which as discussed above may be pixels adjacent in the semiconductor detector, for example by means of addition, subtraction or by other forms of combination, superposition or other mathematical means to combine the corresponding time series of the synchronised pixel signal and the scaled compensation signature, to thereby at least partially cancel the cross talk. Typically, each detected event feature may comprise a step in the signal output by the corresponding pixel, the height of the step representing the energy of the ionizing particle or photon giving rise to the detected event feature.

The invention also provides apparatus comprising said semiconductor detector arranged to output said signals to the analyser of any preceding claim. The semiconductor detector may be monolithic, may be segmented and/or pixelated, may be a germanium detector, and may be an HPGe detector, and may comprise different combinations of these and other properties.

The invention can be used with a suitable semiconductor detector to detect a variety of different types of ionizing radiation resulting from a variety of different physical mechanisms, such as X-rays, gamma rays, high energy protons, neutrons and other particles, arriving at the detector through mechanisms such as fluorescence, scattering, diffraction and so forth.

The invention also comprises a synchrotron beam line comprising the above apparatus and arranged to detect X-rays scattered or emitted fluorescently from a sample.

The invention also comprises corresponding methods, for example a method of analysing signals received from a semiconductor detector for detecting ionizing radiation and comprising a plurality of pixels, each pixel being arranged to output a said signal comprising a series of event features, each event feature representing response of the pixel to an ionizing particle or photon incident on the pixel, the method comprising: providing one or more cross talk compensation or cancellation signatures; for each pixel, detecting event features in the signal from that pixel; and for each pixel, compensating the signals of other, for example adjacent, pixels for cross talk or cancelling this cross talk from the detected event features using selected ones of the one or more cross talk signatures.

The response of a pixel to each photon or particle of incident radiation, and therefore the resulting event feature, typically depends on the energy of the particle or photon, so that the semiconductor detector may be described as a spectral detector, and the described signals comprising event features are spectral signals with the event features comprising the spectral information.

As already discussed above the compensation signatures are typically provided as time domain functions for combining with the signals in other pixels, for example by a superposition, using an alignment or synchronisation with the event giving rise to the cross talk, which also therefore corresponds to synchronisation with the cross talk itself. Synchronisation between the compensation signature and a cross talk feature to be compensated may be achieved by direct detection of the timing of the event giving rise to the cross talk, but may also or instead use matching or alignment of compensation signatures to cross talk features in the other pixels to provide the timing alignment.

The invention also provides methods of deriving or generating the one or more cross talk signatures, for example by measuring multiple instances (that is, time series or time domain functions) of cross talk due to a detected event feature in each pixel to the signal in each adjacent pixel, or in each of all or a subset of the pixels in the detector, and combining said multiple instances of cross talk to form a different said compensation/cancellation signature for cross talk from each said pixel into each different adjacent or said other pixel.

The invention also comprises methods of deriving an energy spectrum of ionizing particles or photons of radiation from detector signals using cross talk compensation or cancellation as set out herein, and methods of characterising a sample using X-ray fluorescence spectroscopy comprising deriving an energy spectrum in this way.

The invention also provides computer program code and computer readable media carrying such code, wherein the code is arranged to put into effect the data processing methods described herein when executed on suitable computer apparatus.

The invention also provides an analyser adapted to analyse the signals from semiconductor detector in real time, and methods correspondingly operating in real time, such that the analyser carries out compensation of the cross talk, and preferably also carries out further analysis, for example to derive an energy for each event, at the same rate (and at substantially the same time) as the output of event features from the semiconductor detector. To this end, the analyser may be implemented for example using field programmable gate array firmware or other digital signal processor hardware elements.

BRIEF DESCRIPTION OF THE DRAWINGS

Embodiments of the invention will now be described, by way of example only, with reference to the accompanying drawings of which.

DETAILED DESCRIPTION OF EMBODIMENTS

Figure 1:
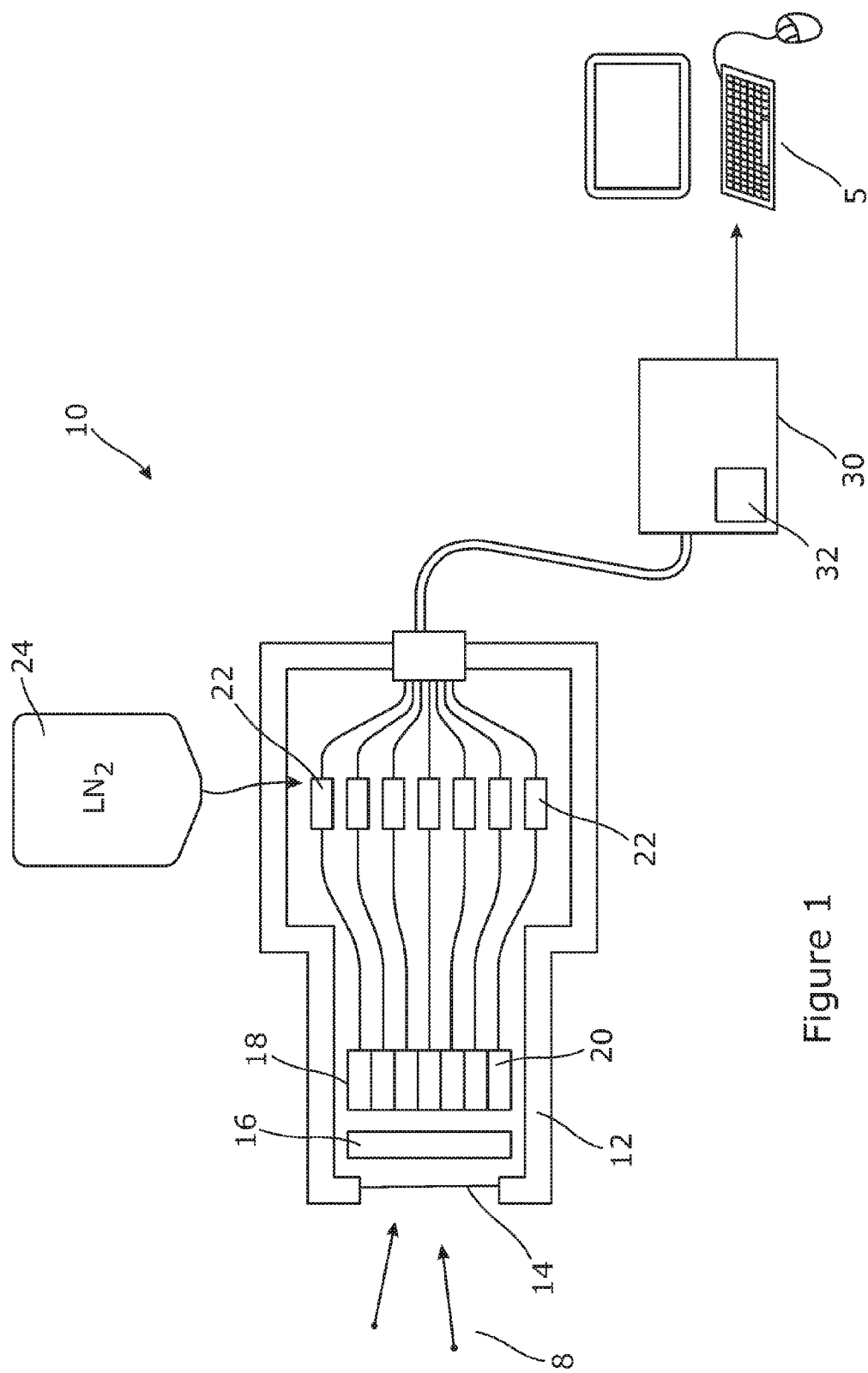
FIG. 1 schematically illustrates an apparatus for detecting ionizing radiation using a pixelated semiconductor detector, and for analysing the resulting signals to determine properties of the ionizing radiation such as an energy spectrum.

FIG. 1 presents a schematic view of an apparatus 10 for detecting particles or photons of ionizing radiation 8. The apparatus comprises a vacuum chamber 12 having a window 14 permitting particles or photons of ionizing radiation such as X-rays or Gamma rays to enter and strike a semiconductor detector 18. The semiconductor detector comprises a plurality of pixels 20, each pixel being arranged to output an electrical signal comprising a series of event features, each event feature representing a response of the pixel to a particle or photon of ionizing radiation striking that pixel. Each such event feature exists as an interval of the time varying signal from the pixel, for example as a continuous electrical signal, or as a time series of voltage or current values sampled from such an electrical signal. The pixels may be arranged in a two dimensional rectilinear array or in other ways.

The apparatus 10 may also comprise a collimator 16 to collimate the ionizing radiation in advance of reaching the detector 18, a plurality of preamplifiers 22, typically one for each pixel to amplify the electrical signal output by each pixel, and an arrangement for cooling the detector 18 and other parts of the apparatus for example using a store 24 of liquid nitrogen.

The signals from the pixels are passed to an analyser 30 for further processing, and output from the analyser 30 may be viewed or further analysed for example on a computer 5 in order to characterise the ionizing radiation 8 striking the detector 18. Typically, the electrical signals from the detector 18 and/or the preamplifiers 22 will be digitised either before being received by the analyser, or at the analyser, with at least some of the analysis of the signals then being carried out on the digitised data.

The detector 18 is preferably a spectral detector which detects the energy of each incident particle or photon. In particular, the detector will usually be a semiconductor detector. Typically, spectral semiconductor detectors operate by having a p-i-n structure, with a substantial depleted region in which an incident particle or photon causes ionization. The resulting charge carriers are swept to the electrodes, and the amount of charge collected is typically in proportion to the energy of the incident particle or photon 8. The collected charge may then be converted to an output current or other representation using circuitry formed at each pixel on the semiconductor detector. Each incident particle or photon then results in an increase in the charge held at the pixel and a consequent step in the output representation, with the height of each step representing the energy of the corresponding incident particle photon. The pixels should be reset periodically to avoid saturation, and this may be done at a fixed or controllable repeat rate for all of the pixels 20 at the same time, using a global reset scheme, or independently for each pixel.

Typically, to put such arrangements into effect, each pixel is equipped with a charge sensitive preamplifier. The charge collected by the pixel enters the charge sensitive preamplifier which converts the charge to a voltage signal. The charge is stored in a feedback capacitor of the preamplifier, and it is this capacitor which has to be reset periodically to avoid saturation. An alternative way to avoid saturation is to use a resistor in parallel to the feedback capacitor so as the capacitor is in fact leaking and then it is discharged continuously. An appropriate choice of the value of the resistor has to be made in order not to add excessive noise to the signal and at the same time to achieve a capacitor discharge rate acceptable for a specific application.

At high rates of particle or photon incidence, the event features in the electrical signal output from a particular p-i-n structure and therefore pixel 20 overlap more frequently with each other, thereby degrading the quality of the output data. To address this difficulty, while covering a similar solid angle of detection, either multiple smaller detectors may be packaged together, or the detector may be constructed to have a plurality of segments or pixels 20, each with an independent output electrical signal. To this end, the detector may be a monolithic array detector, consisting of a single piece or crystal of semiconductor such as germanium, which has been segmented to form the plurality of pixels 20. Such detectors are available from a variety of vendors well known in the field, such as Canberra Industries (see http://www.canberra.com).

A difficulty with semiconductor detectors for ionizing radiation which comprise a plurality of pixels 20 is that the signals received by the analyser may exhibit cross talk, whereby one event feature in the electrical signal gives rise or corresponds to a corresponding cross talk feature in the signal from one or more others of the pixels. This effect may be particularly pronounces when two pixels share a common length of border, i.e. they are adjacent. In a regular, rectangular array of square pixels, each border by which two pixels are adjacent will be of the same length, but in the case of non-square pixels and other array forms the length of common border between two adjacent pixels, and the exact degree of proximity between pixels may vary within the detector. Cross talk may be greater when two pixels are closer together or share a longer common border, but may still occur when two pixels are not adjacent, being separated by one or more other intervening pixels.

To address this issue, the analyser 30 of FIG. 1 is arranged to compensate for this cross talk. The analyser 30 is provided with compensation signature data 32, and for any particular pixel, the analyser detects event features in the signal received from the detector 18 and compensates the concurrent signals from one or more of the other, for example adjacent, pixels using the compensation signature data 32. The compensation signature data typically represents a time domain signal which is combined using a superposition with the signal to be compensated using a synchronization or alignment based on the timing of the event to be compensated for.

Figure 2:
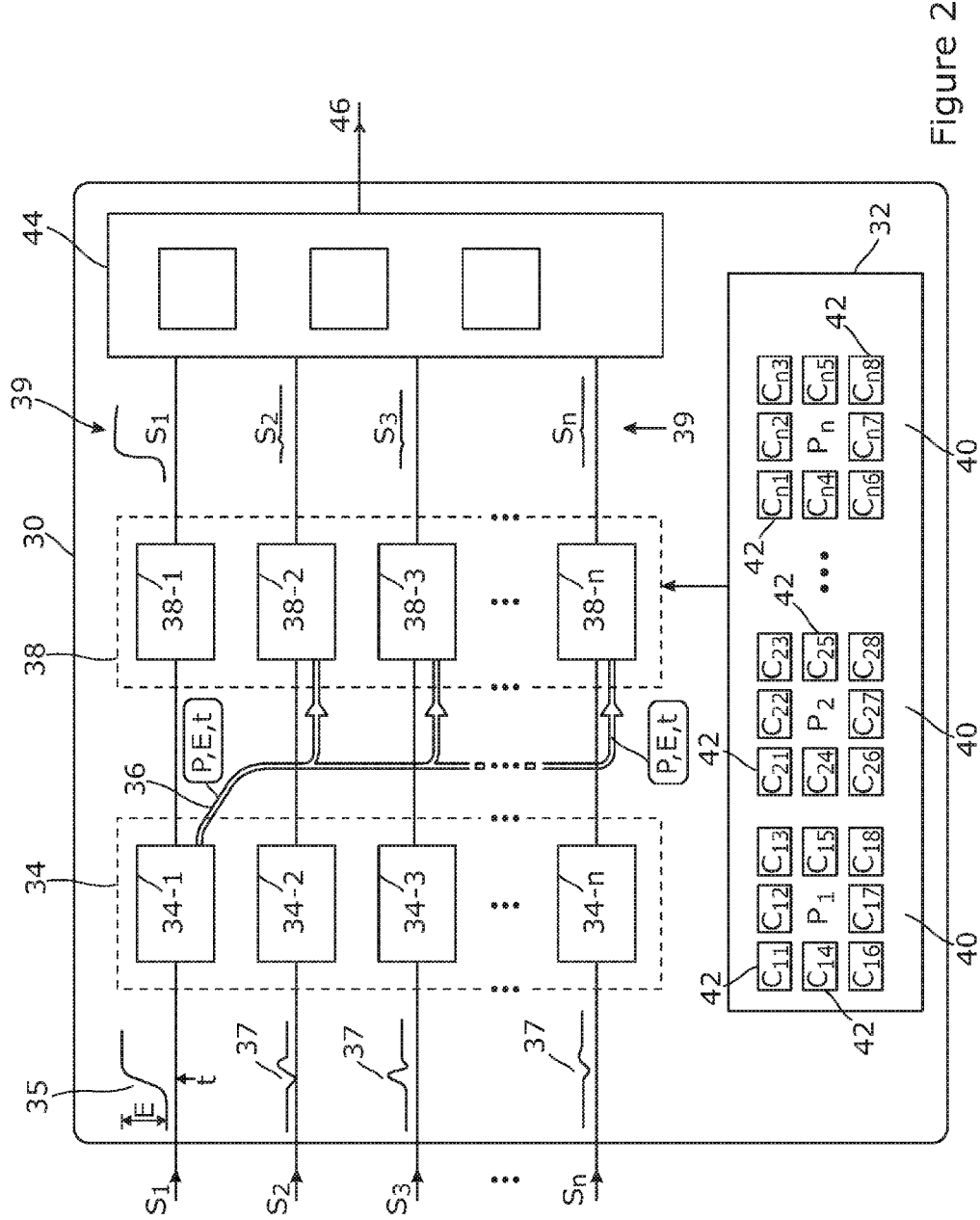
FIG. 2 shows further details of the analyser 30 of FIG. 1, including facilities for compensating for cross talk between the signals from the different pixels of the detector.

An example manner in which the analyser 30 can be arranged to carry out this cross talk compensation is illustrated in FIG. 2. The signals $S_1 \ldots S_n$ received from the pixels 1 . . . n of the detector 18 are passed to an event detector 34 comprising event detector elements 34-1 . . . 34-$n$ each arranged to detect, in one of the signals, event features caused by the incidence of a particle or photon 8 at the relevant pixel 20. Such event features could be, for example, step features in the signal wherein the step meets predefined criteria such as a minimum height and/or a maximum length. In FIG. 2 the signal $S_1$ is shown as having such a step feature 35, of height E (corresponding to an energy of the incident particle or photon) and a timing t. The timing of the feature 35 could typically be by reference some internal clock of the analyser 30, and should enable an event feature in a first signal to be aligned accurately with corresponding cross talk features in others of the signals. Such cross talk features 37 are shown in FIG. 2 within the signals received from pixels 2 . . . n.

The analyser 30 also includes a cross talk compensator 38 comprising cross talk compensator elements 38-1 . . . 38-$n$ each arranged to compensate, in one of the signals $S_1 \ldots S_n$, cross talk caused by or associated with an event feature in another of the signals $S_1 \ldots S_n$. When an event feature is detected in one of the signals, for example in the signal $S_1$ as shown in FIG. 2, the relevant event detector element (element 34-1 in FIG. 2) sends a trigger signal 36 to at least those cross talk compensator elements which process signals received from other detector pixels, for example to those pixels which are adjacent to the signal in which the event was detected. This trigger signal may typically comprise one or both of the height E and the timing t of the detected event feature. The trigger signal 36 either explicitly or implicitly also carries an identifier P of the pixel from which the event feature arose.

On receipt of a relevant trigger signal, i.e. one relating to a detected event feature in another pixel, a cross talk compensator element 38-$i$ compensates the signal $S_1$ for the effect of the cross talk giving rise to the trigger signal, by using cross talk compensation data 32. This can be achieved in various ways. In the example of FIG. 2, a separate set 40 of time domain cross talk signatures is stored for each pixel $P_1 \ldots P_n$, each set 40 comprising a signature 42 for each pixel adjacent to the pixel with which that set is associated. The required set 40 of signatures 42 is selected by a particular cross talk compensator element using the identifier P of the trigger signal 36, and the particular signature 42 in the set is chosen to correspond to the identity of the compensator element and therefore of the adjacent pixel. The selected signature is then scaled or otherwise modified using the height E of the trigger signal, or some other characteristic of the trigger signal such as a rise time, and applied to the signal Si accurately using the timing t of the trigger signal to provide synchronization (that is time based alignment), as a superposition of the signal Si and the scaled signature.

The selected signature 42 may be scaled, for example linearly with the height E of the trigger signal, or in some other way, for example using a non-linear function providing a best fit to data or according to a theory or approximation. The timing alignment of the signature 42 with the signal to which it is to be applied may be carried out using only the timing t of the trigger, or the alignment may be varied, for example as a function of the height E based on a best fit to data or according to a theory or approximation.

Each signature 42 may therefore be a time based function or data series, representing the effect of an event feature 35 in a signal from a first pixel on the signal from another pixel, which can be scaled according to energy, height or other aspects of the event feature 35 of the first pixel. The signature 42 could be stored as a set of parameters of an analytical function, a time series of values, or in other ways.

Where two or more events occur proximal to each other in a signal from a particular pixel, commonly referred to as "pile up", it is both harder to distinguish the proximal events from each other and harder to measure the energy of the associated photons or particles from the event features. In such cases, cross talk compensation using the techniques described herein may also be less effective. However, scaling of the signatures 42 using factors based on the proximal nature of the events can be used to improve the cross talk compensation in such cases. For example, the scaling may be based on the events found within the same signal in a particular time window around the event to be compensated, for example the number of such events, or a metric which counts the number of proximal events (preferably within such a window) weighted by the time separations of each such event from the event to be compensated, or in other ways.

The signatures 42 are typically time limited, stretching some finite time before and after an event for which cross talk is to be compensated. For example, referring ahead to the event features illustrated in FIG. 3, each signature may have a time extent of the order of 1 microsecond in order to sufficiently cover the potential cross talk from an event.

Depending on how they are generated, some or all of the cross talk signatures may not return to baseline, thereby adding an offset when applied to a pixel signal, which if not attended to may give rise to an accumulation of the offset in the pixel signal over multiple event compensation actions. To compensate for this, an equivalent opposite offset (allowing for the energy or other scaling applied to the signature for each event) may be accumulated for each application of a signature, whether being subtracted from the pixel signal, or kept as a separate record, until the pixel signal is reset.

It should be noted that, although in FIG. 2 the cross talk compensation data 32 is shown for each pixel $P_1 \ldots P_n$ as if there were eight adjacent pixels each with a separate signature 42, in reality not every pixel will have eight adjacent pixels, and therefore fewer signatures will typically be required to compensate all adjacent pixels, for example for edge and corner pixels. Signatures 42 may also be shared in various ways between pixels. For example it could be found for a particular apparatus that only a few separate signature shapes are required by the system, and that an indexing arrangement can then be used to cause the cross talk compensator elements to select the correct signature shape, optionally with some scaling or other transformation applicable to particular pixels.

As mentioned above, cross talk signatures 42 and corresponding cross talk compensation arrangements may also be provided for non-adjacent pixels, or other sources within the signal path such as cross talk between the preamplifiers 22 and other electrical conductors between the detector 18 and the analyser 30, in essentially the same way as discussed for adjacent pixels, noting that cross talk effects may extend beyond nearest neighbour pixels. Additionally, although the cross talk compensation data 32 of FIG. 2 implies a rectilinear arrangement of pixels, linear, triangular, hexagonal and other arrangements may also be found and the cross talk compensation data 32 structured accordingly.

The cross talk compensation data 32 for use by the compensator 38 may be derived in various ways. For example, signals $S_1 \ldots S_n$ arising from test or calibration use of the apparatus 10 may be used to detect event features and to measure corresponding cross talk signals (as time series or functions) which occur in each of the other, for example adjacent, pixels for each signal $S_1 \ldots S_n$. Multiple such cross talk events may then be averaged or otherwise combined to obtain a representative cross talk signature for each of the other or adjacent pixels. This analysis may typically involve measuring the cross talk signal for each signal and each other or adjacent pixel for event features corresponding to a range of particle or photon energies, and determining a particular scaling factor with energy for the resulting signature, or obtaining a suitable scaling factor common to all other or adjacent pixels for a particular signal, or obtaining a suitable scaling factor common to all other or adjacent pixels for all of the signals from the detector.

Following any required cross talk compensation by the cross talk compensator elements 38-1 ... 38-n, the cross talk effects seen in the signals of the adjacent pixels considerably reduced, as shown by the signal sketches following the compensator 38 in FIG. 2. These compensated signals 39 are then passed to one or more analysis elements 44 to carry out functions such as event detection, event measurement for example to determine energy of each event, and event counting. These analysis elements 44 could use detection data such as the trigger signals already determined by the event detector elements 34-1 ... 34-n, or could operate on the signals independently from the processes already discussed above. Signals $S_1 \ldots S_2$ in the cross talk compensated form passed to the analysis elements 44 contain a reduced level of cross talk so that the output 46 of the analysis elements is improved. Typically, the output of the analysis elements 44 may comprise an energy spectrum representing the distribution in energy of the particles or photons which have been incident on the detector, for example such a spectrum in respect of the combined areas of all of the pixels, and/or separate spectra in respect of each pixel of multiple combinations of pixels.

Some ways in which the analysis elements 44 may operate on the compensated signals are discussed in R. Farrow et al. "X-ray signal processing electronics for solid state detectors" Review of Scientific Instruments, Volume 66, Issue 2 (1995) pp. 2307-2309, and R. Farrow et al. "XSPRESS: A new generation of detector systems for EXAFS studies", Physica B, Volume 208 (1995), pp 256-258.

One or both of the event detector 34 and cross talk compensator 38 in the analyser may be implemented using software running on one or more general purpose microprocessors if desired, for example acting on signals already digitised either before or after arriving at the analyser 30. However, the very high rates at which the detector 18 may be capable of distinguishing and determining the energy of individual impacts of particles or photons 8 means that a hardware solution implemented directly in circuitry, or using real-time firmware, may be preferred. Such a high speed implementation will help to exploit the stable high flux environments routinely available to users of facilities such as contemporary synchrotron light sources. For example, the invention may be implemented using field-programmable gate array (FPGA) firmware designed at register transfer level VHDL or Verilog. The relatively short crosstalk signatures fit easily within the internal memory of the FPGA allowing many of the signatures to be accessed simultaneously. Other implementations could use graphics processing units (GPUs) and/or other digital signal processors.

The invention may be used at synchrotron light sources for high resolution X-ray and Gamma ray spectroscopy, as well as for other applications as mentioned elsewhere herein. In order to exploit the increasing brilliance of such light sources, beam lines require detectors that do not saturate nor lose their energy resolving capabilities as X-ray flux increases. There are two main approaches used for detector system performance to keep pace with increasing flux. They are to increase the number of pixels in a given solid angle, and to enable a given number of pixels to work to higher per pixel count rate without performance degradation.

The Diamond Light Source (DLS) in the United Kingdom combines both of these approaches on their main X-ray spectroscopy beam lines, employing monolithic segmented Canberra Industries HPGe detectors with a large number of pixels (9, 36 and 64 pixels), instrumented with in-house designed fast low-noise preamplifiers coupled to XSPRESS2 analysers which are an updated and enhanced version of the XSPRESS analysers referenced above.

It has been observed by the inventors that at least two of the important specifications for X-ray fluorescence spectroscopy—energy resolution and peak to background ratio—degrade considerably as the count rate per pixel increases, becoming more pronounced with increasing energy of the incident X-rays 8. Close inspection of the unprocessed signals from the detector pixels or preamplifiers shows that there is considerable cross talk into each pixel from X-ray interactions occurring on neighbouring pixels, leading to degraded performance. The inventors have found that removal of such cross talk artefacts leads to improved performance, especially at higher intrinsic count rates.

Measurements of X-ray fluorescence from samples of different chemical elements (therefore having different characteristic X-ray fluorescence emission energies) at various count rates were performed on a beam line of the Diamond Light Source. The fluorescence was measured using an apparatus as shown in FIG. 1, using a Canberrra Industries 36 pixel HPGe detector 18 connected to an Xspress2 analyser 30, operated such that the pixels 20 of the detector are simultaneously reset periodically (global reset).

To calculate cross talk compensation data 32 for use in an apparatus such as that of FIGS. 1 and 2, X-ray fluorescence data with a relatively low count rate was used to minimise the number of concurrent event features in particular pixels as well as between adjacent pixels. The concurrent electrical signals from the preamplifiers 22 for a number of neighbouring pixels under the low count rate conditions were digitised and stored. This data was used as the input to a Matlab™ based software model arranged to emulate the analysis elements 44 of the XSPRESS2 analyser, and the data from all of the pixels was synchronized by taking advantage of the global reset scheme.

Figure 3:
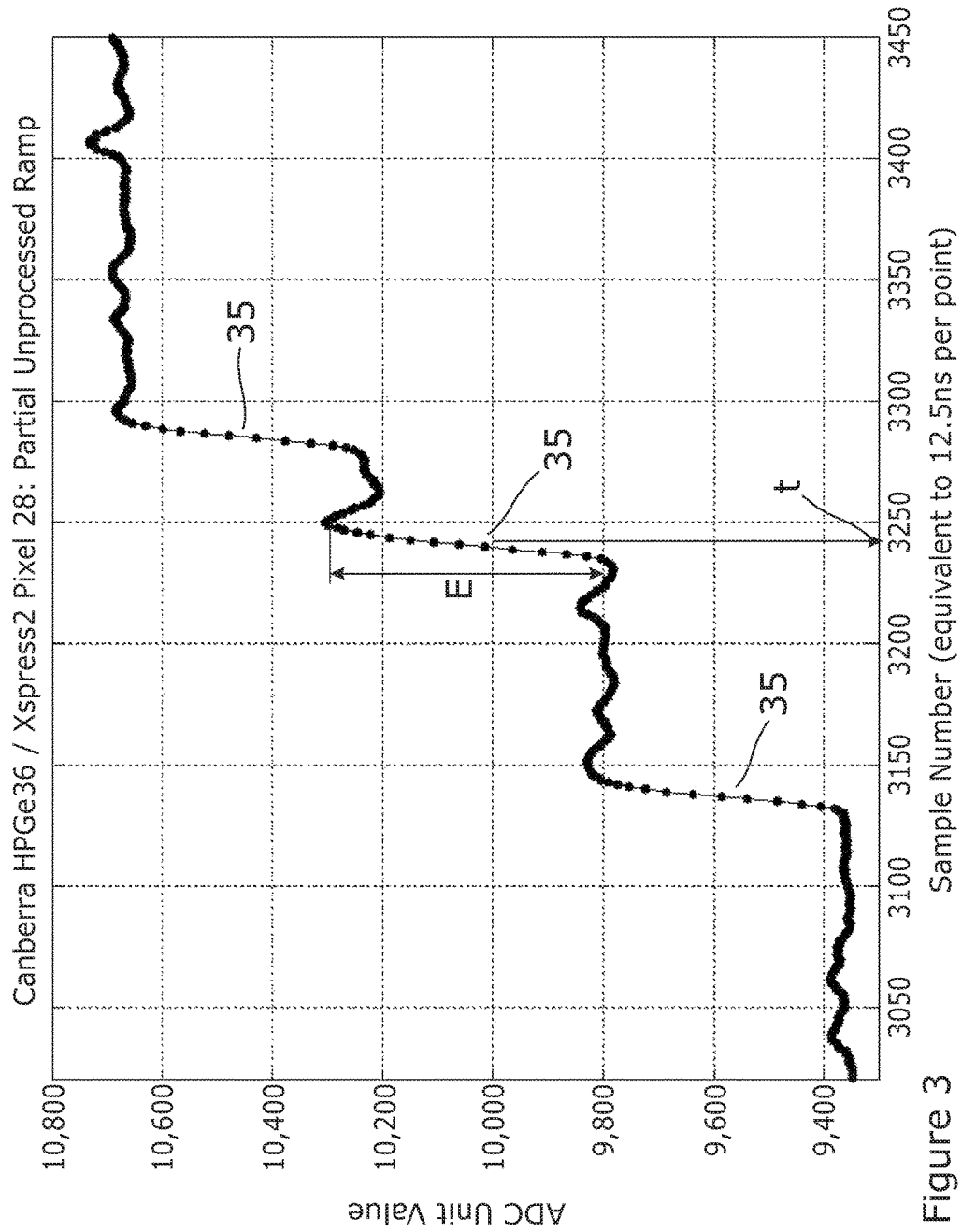
FIG. 3 graphs a signal from a pixel of the detector before cross talk compensation, showing event features in the form of steps, the height of each step approximating to the energy of the ionizing particle or photon incident on the pixel.

An example of part of a digitised signal from one of the pixels, sampled at 14 bits and 80 MHz, is shown in FIG. 3. A series of event features 35 in the form of steps is seen, with each step representing an accumulation of charge at the pixel caused by the incidence of an X-ray, with the height of the step corresponding to the X-ray energy.

The Matlab model was then used to apply an event detection process, similar or equivalent to the event detector process 34 of FIG. 2, to determine a first pass estimation of height E and timing t for each event feature 35 in the signal for each pixel. For events detected in the signal of a particular central pixel, the resulting cross talk signatures as time series in each of the eight neighbouring pixels were measured, taking care to avoid use of events overlapping with events detected in the neighbouring pixels. For each neighbouring pixel the cross talk signatures were normalised for height E of the event and averaged to form a cross talk signature 42 for that neighbouring pixel in respect of events at the central pixel. Repeating this process for all pixels in the detector leads to a set of cross talk calibration data 32 consisting of a set 40, for each central pixel, of energy-normalised cross talk signatures 42 representing the expected time series or function of cross talk into each pixel adjacent to the central pixel (noting that the term central is not intended to exclude edge or corner pixels which are not strictly "central" to their adjacent pixels).

Figure 4:
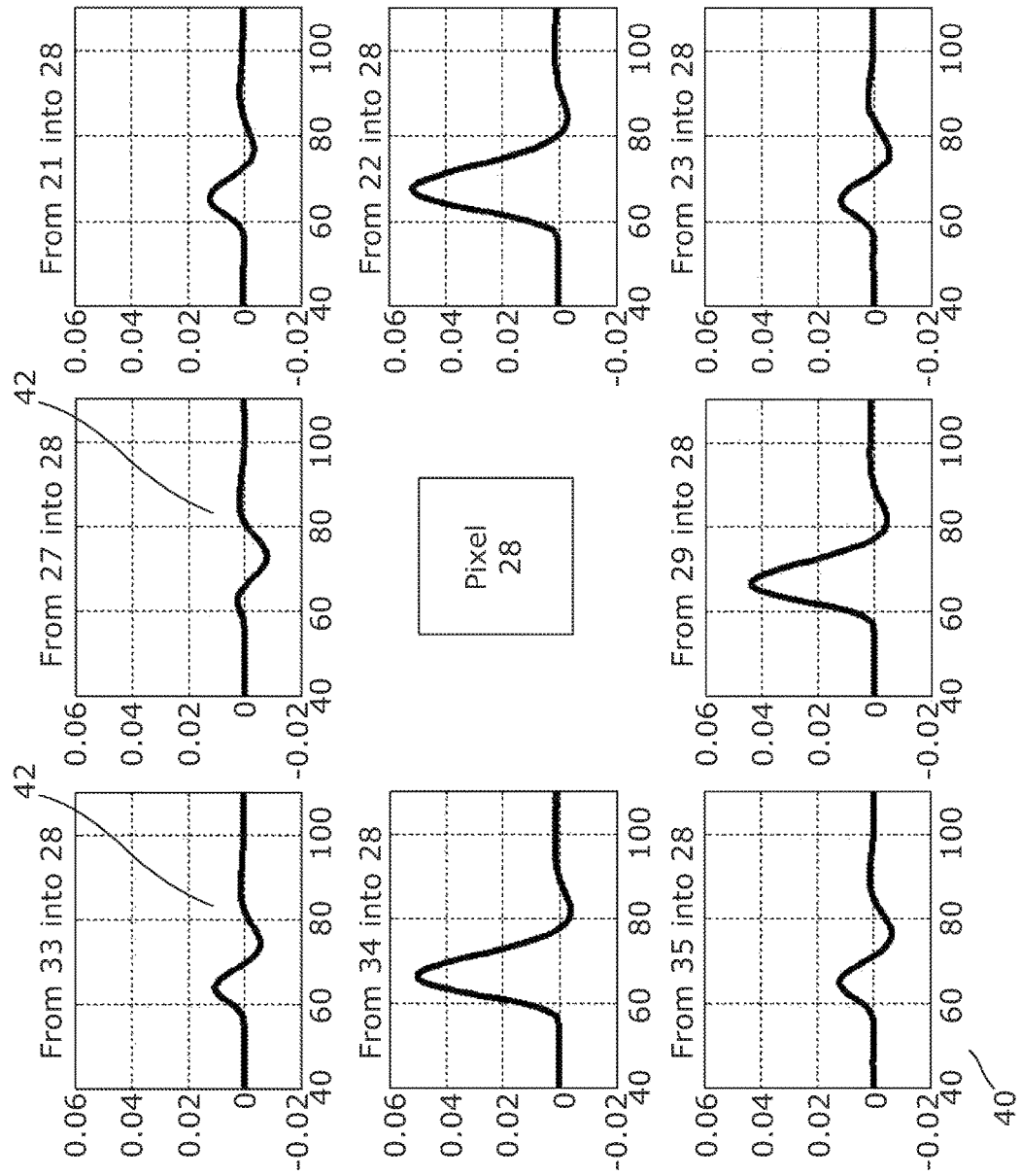
FIG. 4 shows scalable cross talk compensation signatures for compensating for cross talk in pixels adjacent to a pixel in which an event feature is detected.

An example set of such cross talk signatures 42 is shown in FIG. 4, for a "central" pixel denoted pixel 28, having adjacent pixels in a rectilinear array denoted 21, 22, 23, 27, 29, 33, 34 and 35. The horizontal axes of the graphs showing each signature 42 are marked in units of sequential digitisation samples, so that the numerical range 40-110 represents nearly 1 microsecond, the vertical axes are normalised to the energy of the detected event feature to be compensated. The compensation signal to be applied to pixel 33 for example, will therefore peak at about 1% of the size of the corresponding event feature detected for pixel 28, whereas the compensation signal to be applied to pixel 34, will peak at about 5% of the corresponding event feature for pixel 28.

It will be seen that all of the signatures 42 of FIG. 4 have at least subtly different shapes, so it may be appropriate for the cross talk calibration data 32 to include a separate data series or parameterised function signature which is different for each adjacent pixel of each set 40 corresponding to each central pixel. However, the similarity between some of the signatures in FIG. 4 will also be noted, and this similarity could be used to reduce the number of signatures stored and used in various ways.

Having calculated cross talk calibration data 32 in respect of each pixel as set out above, this data was used to carry out cross talk compensation on uncompensated signal data taken from an experiment with a relatively high count rate of X-ray detection, so that event features were frequently seen concurrently and overlapping in adjacent pixels. This cross talk compensation was initially carried out using the described Matlab model, noting that the same process can be implemented in the analyser 30 of FIG. 2 in various ways as already discussed above in connection with FIG. 2.

During a first stage of the cross talk compensation, corresponding to the event detector 34 of FIG. 2, event features in the raw signal for each pixel were detected and measured to output a height E and a time t of each event. During a second stage, corresponding to the compensator 38 of FIG. 2, the height E was then used to scale linearly the cross talk signatures for each adjacent pixel to a central pixel for which an event was detected, and the scaled signatures 42 were then subtracted from the uncompensated signals for those adjacent pixels, using the detected event feature time t to ensure accurate alignment, to yield compensated signals for all of the pixels.

Subsequently, the compensated signals for the pixels were analysed using a Matlab model of the analysis elements 44 of FIG. 2, and the results compared with the same analysis applied to the uncompensated, raw signals. This analysis involves the use of further downstream event feature shaping and background leakage ramp compensation, following adaptive rate filtering, and then detection of event features for height which is used to derive the energy of each X-ray incident on each pixel.

Figure 5:
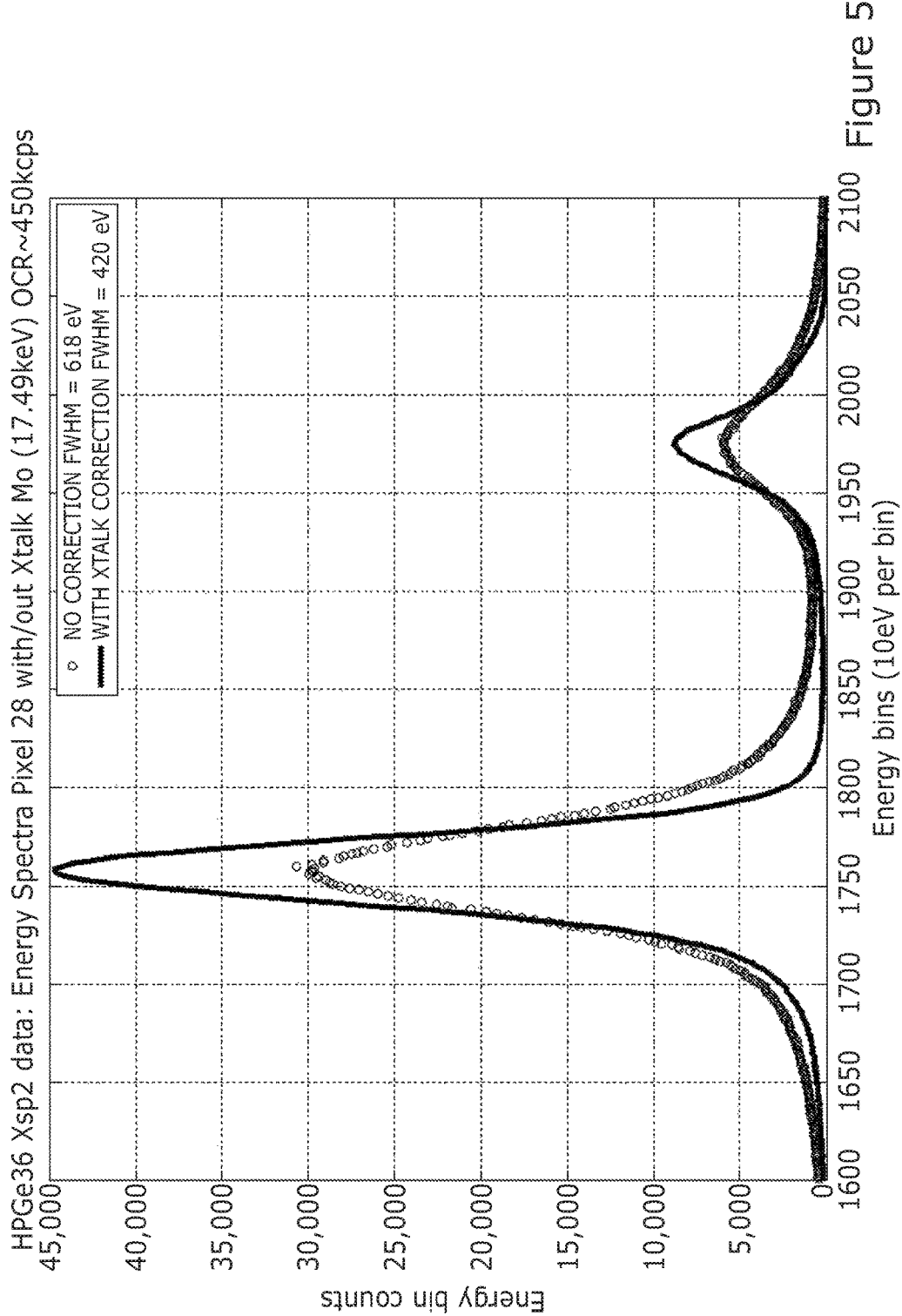
FIG. 5 graphs X-ray energy spectra from a Molybdenum sample derived with and without using the described techniques of cross talk compensation.

Combining large numbers of such events then provides an energy spectrum for the radiation, which for comparison purposes was derived with and without use of the cross talk compensation processing. FIG. 5 shows a part of an energy spectrum derived in this way for a Molybdenum sample, around the $K_\alpha$ and $K_\beta$ peaks. The points represented by circles show an energy spectrum derived without cross talk compensation, and the solid line shows the results of the same electrical signals from the detector, but processed with cross talk compensation as discussed above. The comparison shows a significant improvement in spectral response, with energy resolution improving by typically 35% and peak to background (low energy tail) ratio typically doubles.

The described method of cross talk compensation relies to some extent on the characteristics of the cross talk remaining approximately the same from event to event, albeit scaled or modified according to energy of the event or some other measureable characteristic. However, the inventors have found that there is generally a good match between any given cross talk feature in adjacent pixel and the derived cross talk signature 42.

Various modifications may be made to the described embodiments without departing from the scope of the invention. For example, although some detailed embodiments have been described in which the cross talk compensation signatures are used to compensate signals of adjacent pixels, or other pixel combinations, before further or subsequent analysis of those signals to derive characteristics of those signals such as energies of the ionizing particles or photons, the cross talk compensation signatures may also or instead be used for cross talk compensation as part of the analysis of the signals to derive such characteristics.

The invention claimed is:

1. An analyser arranged to receive signals from a semiconductor detector for detecting the energies of particles or photons of ionizing radiation, the semiconductor detector comprising a plurality of pixels, each pixel being arranged to output a time varying signal comprising a series of time varying event features, each event feature representing a time varying response of the pixel to an ionizing particle or photon incident on the pixel, the signals received by the analyser exhibiting cross talk between each other whereby at least some of the event features give rise to corresponding cross talk features in the signal output by at least one other pixel,
the analyser comprising one or more cross talk compensation signatures provided as time domain functions,
for each of a plurality of said pixels, the analyser being arranged:
  to detect an event feature in the signal from that pixel;
  based on the detected event feature, to synchronize selected one or more cross talk compensation signatures to portions of signals from one or more other ones of the pixels at which cross talk from the event feature is expected, the portions being concurrent with the detected event feature; and
  to analyse concurrent portions of the signals from the one or more other ones of the pixels, the analysis including compensation for said expected cross talk using the corresponding synchronized cross talk compensation signatures.

2. The analyser of claim 1 wherein the cross talk compensation signatures are normalized with respect to one or more properties of the event features, and the analyser is further arranged to measure said one or more properties of said detected event feature and to scale the selected cross talk compensation signatures according to the measured properties for use in the compensation for said expected cross talk.

3. The analyser of claim 1 wherein the one or more properties comprise a property corresponding to energy of the photon or other particle of ionizing radiation giving rise to the corresponding event feature.

4. The analyser of claim 1 where analysis of the concurrent portions of signals from one or more other ones of the pixels comprises superposition of each of said concurrent signal portion with a respective selected and synchronized cross talk compensation signature.

5. The analyser of claim 1 further comprising detecting a timing of the event feature, and synchronizing the selected cross talk compensation signatures with the corresponding concurrent portions of signals using the detected timing.

6. The analyser of claim 1 wherein the one or more cross talk compensation signatures comprise at least one such compensation signature for each pixel, the analyser being arranged to use the at least one such compensation signature to compensate cross talk in the electrical signals from one or more other ones of the pixels.

7. The analyser of claim 1 wherein the one or more cross talk compensation signatures comprise a set of compensation signatures for each pixel, the analyser being arranged to use each member of the set for compensating cross talk in the electrical signals of a different one of the other ones of the pixels.

8. The analyser of claim 1 wherein the other ones of the pixels comprise one or more adjacent pixels.

9. The analyser of claim 1, arranged to compensate cross talk in analysis of the concurrent portions of electrical signals from one or more other ones of the pixels using one or more selected ones of the cross talk compensation signatures scaled according to one or more properties of the concurrent detected event feature causing the cross talk.

10. The analyser of claim 9 wherein the one or more properties of the concurrent detected event feature causing the cross talk comprise a measure of the energy of the ionizing particle or photon giving rise to the detected event feature.

11. The analyser of claim 1 wherein each detected event feature comprises a step in the signal output by the corresponding pixel, the height of the step representing the energy of the ionizing particle or photon giving rise to the detected event feature.

12. An apparatus comprising the analyser of claim 1 in combination with said semiconductor detector, the semiconductor detector being arranged to output said signals to the analyser.

13. The apparatus of claim 12 wherein the semiconductor detector is a segmented HPGe detector.

14. The apparatus of claim 12 further comprising a synchrotron beam line wherein the semiconductor detector and the analyser are arranged to detect X-rays scattered or emitted fluorescently from a sample.

15. A method of analysing time varying signals received from a semiconductor detector of ionizing radiation comprising a plurality of pixels, each pixel being arranged to output a said signal comprising a series of time varying event features, each event feature representing a time varying response of the pixel to an ionizing particle or photon incident on the pixel which depends on the energy of the particle or photon, the method comprising:

provlding one or more cross talk compensation signatures as time domain functions;

for each plurality of said pixels:

receiving a said signal output from the pixel;

detecting an event feature in the signal from the pixel;

based on the detected event feature, synchronizing selected one or more cross talk compensation signatures to portions of signals from one or more other ones of the pixels at which cross talk from the event feature is expected, the portions being concurrent with the detected event feature; and analysing the concurrent portions of the signals from of the one or more other ones of the pixels, the analysis including compensation for said expected cross talk using the corresponding synchronized cross talk compensation signatures.

16. The method of claim 15 wherein said compensation for said expected cross talk comprises superposition of the one or more synchronized cross talk compensation signatures with the concurrent portions of the signals from the one or more other ones of the pixels.

17. The method of claim 16 further comprising detecting timing of said detected event feature, and using the detected timing to synchronise the cross talk compensation signatures with the corresponding event feature for compensating analysis of said signals of other ones of the pixels for cross talk.

18. The method of claim 15 wherein, for each detected event feature, the other ones of the pixels comprise pixels adjacent to the pixel of the detected event feature.

19. The method of claim 15 further comprising, for each detected event feature:

measuring one or more properties of said event feature;

scaling the selected one or more cross talk compensation signatures according to the measured one or more properties; and combining the scaled selected cross talk signatures with the concurrent portions of the signals of other ones of the pixels.

20. The method of claim 19 wherein the one or more properties comprise a property corresponding to energy of the ionizing particle or photon giving rise to the detected event feature.

21. The method of claim 15, wherein, for each pixel at which event features are to be detected, the one or more cross talk compensation signatures comprise a set of compensation signatures, each member of the set being for use in compensating cross talk from said pixel into a different other one of the pixels.

22. The method of claim 15, further comprising generating said time domain function cross talk signatures by measuring multiple instances of cross talk signals due to a detected event feature in each pixel to each of a plurality of other pixels, and combining said multiple instances of cross talk signals to form a different said compensation signature for cross talk from each said pixel into each different one of the other pixels.

23. The method of claim 15, further comprising deriving an energy spectrum of said ionizing particles or photons from the compensated signals.

24. The method of claim 23, further comprising characterising a sample using X-ray fluorescence spectroscopy, wherein an energy spectrum is derived using the method of claim 23.

* * * * *